(12) United States Patent
Kayabas (10) Patent No.: US 11,525,466 B2
(45) Date of Patent: Dec. 13, 2022

(54) VALVE

(71) Applicant: Festo SE & Co. KG, Esslingen (DE)

(72) Inventor: Metin Kayabas, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 88 days.

(21) Appl. No.: 16/937,264

(22) Filed: Jul. 23, 2020

(65) Prior Publication Data

US 2021/0025409 A1   Jan. 28, 2021

(30) Foreign Application Priority Data

Jul. 25, 2019 (DE) .......................... 102019211004.5

(51) Int. Cl.
| | | |
|---|---|---|
| *F16K 27/04* | (2006.01) | |
| *F15B 13/04* | (2006.01) | |
| *F16K 11/07* | (2006.01) | |

(52) U.S. Cl.
CPC ...... *F15B 13/0402* (2013.01); *F16K 11/0712* (2013.01); *F16K 27/041* (2013.01)

(58) Field of Classification Search
CPC .. F16K 11/0712; F16K 11/0704; F16K 11/07; F16K 27/041; F16K 27/04; F16K 31/426; F15B 13/0402; F15B 2211/322; Y10T 137/8671
See application file for complete search history.

(56) References Cited

U.S. PATENT DOCUMENTS

| | | | |
|---|---|---|---|
| 3,338,549 A | 8/1967 | Anthes et al. | |
| 2001/0022474 A1* | 9/2001 | Tachibana | ........... F16K 31/0613 |
| | | | 310/15 |
| 2003/0089875 A1 | 5/2003 | Hall | |
| 2014/0345728 A1* | 11/2014 | Prescott | ................ B60T 15/027 |
| | | | 137/625.69 |
| 2017/0009896 A1* | 1/2017 | Bugatti | ................. F16K 27/041 |
| 2017/0356563 A1* | 12/2017 | Hoch | ..................... B01D 35/30 |
| 2019/0120260 A1* | 4/2019 | Biwersi | ............... F15B 13/0402 |

FOREIGN PATENT DOCUMENTS

| | | |
|---|---|---|
| DE | 2039932 A1 | 2/1971 |
| DE | 2056072 A1 | 5/1971 |
| DE | 7924113 U1 | 11/1980 |
| DE | 102015221940 B3 | 10/2016 |

* cited by examiner

*Primary Examiner* — Kelsey E Cary
(74) *Attorney, Agent, or Firm* — Hoffmann & Baron, LLP (57) ABSTRACT

A valve, having a valve housing, in which a housing interior is formed, in which a movable valve slide is located. The valve slide is impinged upon by a compression spring that is supported via a supporting element on the valve housing. The supporting element has a supporting wall, from which a plurality of supporting arms protrudes, which axially overlap the valve slide in each axial position. On the supporting arms guide surfaces are formed for linear guidance of the valve slide. The supporting arms are springily deflectable and in each case have a radial support surface, with which they are supported on the valve housing.

20 Claims, 4 Drawing Sheets

VALVE

BACKGROUND OF THE INVENTION

The invention relates to a valve, with a valve housing, in which a housing interior extending along a main axis is formed and which has a housing perimeter wall delimiting the housing interior at its radial outer circumference and a housing rear wall delimiting the housing interior at a rear side, with a valve slide arranged in the housing interior, which is axially displaceable for positioning in various switching positions relative to the valve housing by changing its axial position adopted in relation to the valve housing, and with a compression spring arranged in the housing interior in a rear interior end portion axially between the valve slide and the housing rear wall, by which the valve slide is preloaded in one of its possible switching positions and which is supported on the one hand on a rear end portion of the valve slide facing the housing rear wall and on the other hand on a supporting wall of a supporting element extending in the rear interior end portion and supported axially in relation to the housing rear wall.

In a valve of this type known from DE 10 2015 221 940 B3, a valve slide is accommodated in an axially displaceable manner in a housing interior of a valve housing. A compression spring similarly arranged in the housing interior acts axially between the valve slide and a housing rear wall of the valve housing and constantly preloads the valve slide in a switching position functioning as a basic position. Through fluid impingement of the valve slide by means of a drive device the valve slide can be switched to another switching position approaching the housing rear wall, wherein the compression spring is compressed. Supporting of the compression spring with respect to the valve housing takes place via an intermediate supporting element, which simultaneously performs the function of a movable connecting link. In particular if the valve slide is moved out of the basic position, the increased spring forces from the compression spring which then occur lead to the valve slide being pushed to the side transversally to the main axis, which can lead to leaks and increased wear.

DE 79 24 113 U1 indicates a valve, having a valve slide arranged displaceably in a valve housing, which is impinged upon at its end portion by a compression spring. The end portion of the valve slide arranged on the compression spring plunges in an axially displaceable manner into a guide hole of a housing cover of the valve housing.

SUMMARY OF THE INVENTION

The object of the invention is to take measures which allow a functionally reliable and low-wear operation of the valve.

To achieve this object in conjunction with the abovementioned features, it is provided that the supporting element comprises a plurality of individual supporting arms extending axially in the direction to the valve slide inside the rear interior end portion starting from the supporting wall, wherein the supporting arms are arranged distributed around the main axis and with respect to the main axis can be deflected in a spring resilient manner in the radial direction independently of one another, wherein the supporting arms axially overlap the rear end portion of the valve slide on a radially outward side thereof independently of the axial position, which the valve slide adopts relative to the valve housing, and wherein the supporting arms, respectively, are provided radially inwards with a guide surface slidably bearing against the radial outer circumference of the valve slide and are provided radially outwards with a radial support surface bearing against the housing perimeter wall.

In this way, the valve is provided with a supporting element, which not only serves for the axial support of the compression spring, but also for the radial support of the rear end portion of the valve slide. The supporting element has a supporting wall, on which the compression spring is supported, in order to preload the valve slide in a switching position functioning as a basic position. Furthermore, the supporting element has a plurality of individual supporting arms, which at one end are attached to the supporting wall and starting from there protrude in the direction of the valve slide, wherein they axially overlap the rear end portion thereof radial outwards. These supporting arms serve to radially support the valve slide with respect to the valve housing. This support effect is the result of the supporting arms with guide surfaces formed on them, independently of the switching position of the valve slide, constantly bearing radially outwards against the outer circumference of the valve slide and simultaneously with guide surfaces formed radially outwards on them being supported on the housing perimeter wall surrounding the housing interior. Through the guide surfaces there is a radially supported linear guidance of the valve slide on its rear end portion impinged upon by the compression spring. The transverse forces necessary for the support are applied by the housing perimeter wall, on which the supporting arms are supported with their radial support surfaces. Due to their springiness, the supporting arms are able to align independently of one another with respect to the housing perimeter wall and thereby position the guide surfaces in such a way that the valve slide is aligned exactly coaxially in the housing interior. In this context, the interior peripheral surface of the housing peripheral wall radially outwardly delimiting the housing interior expediently forms a counter-support surface, against which the supporting arms bear with their support surfaces. This counter-support surface preferably has a circular cylindrical design. Since the radial guide contact resulting from the axial overlapping between the supporting arms and the valve slide sliding on the guide surfaces when it is switched is present in each axial position of the valve slide, the radial relative position between the valve slide and the valve housing is constant independently of the operating status of the valve, resulting in a highly secure positioning in conjunction with a low susceptibility to wear. In particular, this prevents the valve slide which is normally surrounded by rubber-elastic sealing rings being pushed unevenly by the compression spring onto the sealing rings, which could result in leaks and localised signs of wear.

The embodiment of a valve according to the invention is suitable for any kind of valve where the valve slide is preloaded by a compression spring in a switching position. The invention is used particularly advantageously in connection with multi-port valves. The application of the invention is independent of the type of fluid to be controlled by the valve, though an embodiment for the control of compressed air is preferred.

Advantageous further developments of the invention are described in the dependent claims.

Optimal radial adaptability for the springily deflectable supporting arms results if in each case between adjacent supporting arms in the circumferential direction of the main axis an open longitudinal slot is formed. The open longitudinal slots also facilitate if necessary breathability within the housing interior for the compressed air displaced upon switching of the valve slide.

The support surfaces and the guide surfaces are arranged at an axial distance from the supporting wall on the supporting arms. Preferably, the supporting arms each have a head portion at an axial distance from the supporting wall on which in each case one of the guide surfaces and one of the radial support surfaces is formed. The head portion is connected with the supporting wall via an axially extending web portion wherein the web portion in the radial direction with respect to the main axis expediently has a limited thickness such that the head portion with respect to the web portion protrudes both radially outwards and also radially inwards. Thus, the web portion is radially recessed with respect to both the guide surface and the radial support surface.

The supporting arms, with the exception of the portion occupied by the radial support surface, are expediently arranged over their entire length at a radial distance from the interior peripheral surface of the housing perimeter. This ensures that the effect of the radial support on the supporting arms is restricted to the support surface.

The radial outer circumference of the valve slide expediently has a circular cylindrical form at least at the rear end portion interacting with the guide surfaces of the supporting element. The valve slide preferably has a circular cylindrical outer contour over its entire axial length, but which is expediently composed of length portions of different diameters, to allow the desired fluid control function of the valve slide. The guide surfaces of the supporting arms are preferably in each case concavely curved to match the portion of the outer circumference of the valve slide slidably bearing against them. In this way bearing over a large area for the purpose of low-wear linear guidance can be achieved.

In order that the compression spring is securely radially retained in the rear interior end portion of the housing interior, the supporting element expediently has a centrally-arranged centering pin extending from the supporting wall axially in the direction of the valve slide, onto which the compression spring is coaxially pushed. The compression spring is expediently designed as a helical spring independently of the presence of a centering pin. The centering pin preferably has a longer axial length than the supporting arms, so that it axially overhangs the supporting arms on the side facing the valve slide.

The latter is particularly advantageous if the valve slide has on its rear end portion a recess open towards the housing rear wall, in which the compression spring plunges with a longitudinal portion. In the corresponding switching position of the valve slide, the end portion of the centering pin can also plunge into this recess. Within the recess the valve slide expediently has a support surface axially facing the housing rear wall, against which the end face of the compression spring bears to generate the desired preloading.

In principle, it is possible for the supporting element to form an integral component of the valve housing and in particular to be integrated into the housing rear wall. In this case the supporting element is axially supported with respect to the housing rear wall, such that it is designed as a structural unit with this housing rear wall. In other words, the supporting wall is in this case formed by a portion of the housing rear wall.

However, an embodiment of the valve in which the supporting element is a separate component with respect to the valve housing, which is inserted as a separate insert in the rear interior end portion of the housing interior and which bears axially against an interior wall surface of the housing rear wall facing the housing interior, wherein the housing rear wall is a separate component with respect to the supporting element, is considered to be substantially more advantageous. Preferably, between the supporting element and the housing rear wall there is no fixed connection, with instead the supporting element being axially supported on one side on the housing rear wall, in that it is pressed axially inwards by the compression spring axial against an interior wall surface of the housing rear wall.

In this connection, it is particularly advantageous if the housing rear wall is formed by a separate housing cover of the valve housing which is secured—in particular releasably—to a housing main body of the valve housing defining the housing perimeter wall. In this case the insertion of the supporting element into the housing interior can take place in the still non-assembled state of the housing cover.

The supporting element preferably has a totally one-piece design and is made of plastic. It can be manufactured very economically as an injection-moulded part.

The supporting wall of the supporting element preferably has a disc-shaped design. To save material, it can have a very low axial thickness.

In the areas radially inwardly adjoining the supporting arms the supporting wall with a disc-shaped design expediently has in each case an axial wall through-opening. This results in optimum material usage and the possibility of simple production. Moreover, this will favour production by injection moulding.

The preferably disc-shaped designed supporting wall of the supporting element expediently has a radial outer circumference, which functions as a centering surface, which for the coaxial centering of the supporting element with respect to the main axis within the rear interior end portion bears against the interior peripheral surface of the housing perimeter wall. This centering surface can be designed as a continuous circular cylinder. An embodiment in which the supporting wall in the areas radially outwardly adjoining the supporting arms in each case has a radially outwardly open wall recess interrupting the centering surface, is considered to be particularly advantageous. This means that the centering surface is composed of a plurality of centering surface portions spaced apart from each other and distributed about the main axis.

It is considered to be particularly advantageous if in the interior peripheral surface of the housing perimeter wall in the area of the rear interior end portion an inwardly-open annular groove-like retaining recess is formed wherein each support has a radially outwardly protruding retaining projection, which engages radially in this retaining recess. This configuration allows the supporting element during assembly of the valve to be secured, in the state of impingement by the compression spring, with positive locking in a pre-assembly position on the housing perimeter wall. Thus, additional assembly work can be carried out with respect to the valve without the need for the supporting element impinged upon by the compression spring to be separately retained. So, due to the retaining projections that engage in the retaining recess to prevent it being pushed out of the housing interior by the compression spring, the supporting element can be axially supported with positive locking on the housing perimeter wall. When the supporting element is axially inserted in the rear interior end portion the supporting arms due to their springy elasticity are able to be briefly deflected inwards, until the retaining projections reach the retaining recess and engage in the same.

The embodiment outlined above is particularly advantageous, if the supporting element is formed separately to a housing cover of the valve housing forming the housing rear wall. Here it is advantageously possible to initially insert the supporting element in the preassembly position and then through the housing cover when it is subsequently positioned to move it completely into the desired final assembly position corresponding to the use position. In this final assembly position the compression spring then has the spring loading desired for operation of the valve.

In particular in connection with the abovementioned assembly possibility it is expedient if the width measured in the axial direction of the main axis of the annular groove-like retaining recess is greater than the correspondingly measured width of the respectively associated retaining projection. As a result, in the state in which the retaining projections engage in the retaining recesses adopting the preassembly position the supporting element has limited axial movability relative to the housing perimeter wall.

The valve according to the invention serves to control the flow of a fluid. The fluid is preferably compressed air or another gaseous or liquid pressure medium. Expediently, in the housing interior coaxially to the main axis a plurality of annular sealing units are arranged axially in succession and fixed relative to the housing, which in each case comprise a rubber-elastic sealing ring designed for a sealing interaction with the radial outer circumference of the valve slide. Portions of the housing interior positioned between axially adjacent sealing units are in each case connected with a vertical channel passing through the valve housing, which leads to an exterior surface of the valve housing, to allow appropriate connection measures to be taken. Depending on the switching position of the valve slide, the vertical channels are fluidically interconnected with various patterns. In this way, by way of example, a fluid-actuated drive connected to the valve can be actuated with fluid power.

In a particularly advantageous embodiment, the valve according to the invention is designed as a monostable multiport valve, the valve slide of which can be switched between two switching positions. One of the two switching positions represents a stable basic position determined by the impinging by the compression spring. The valve has a drive device, via which the valve element for displacing from the basic position and for switching to the other switching position, can be impinged upon by a driving force. Upon removal of the driving force, due to the spring loading the valve slide reverts to the basic position. This driving force can, by way of example, be a magnetic force, if the drive device is formed by an electromagnetic device. Preferably, however, the drive device is designed as a pilot control valve device, which is electrically actuated and allows a controlled impingement of the valve slide with a control fluid, providing the driving force as fluid power.

BRIEF DESCRIPTION OF THE DRAWINGS

The invention is explained in more detail below with reference to the attached drawing. Which shows as follows.

DETAILED DESCRIPTION

The valve designated in its entirety by reference numeral 1 serves to control the flow of a fluidic pressure medium, which in particular involves compressed air.

The valve 1 has a valve housing 2, in which a housing interior 3 having a longitudinal extension is formed. The housing interior 3 has a main axis 4 shown in a dot-dash fashion, which is formed by the central longitudinal axis of the housing interior 3.

The valve housing 2 has a housing perimeter wall 5 delimiting the housing interior at its radial outer circumference. It also has a housing rear wall 7 sealing the housing interior 3 on a rear side 6 of the valve 1. On a front side 8 the housing interior 3 is delimited by a housing front wall 9.

The valve housing 2 has a multi-part design and has a housing main body 12 forming the housing perimeter wall 5. The housing rear wall 7 is preferably formed by a housing cover 13 that is separate from the housing main body 12, which for a better differentiation is referred to in the following as rear housing cover 13. The rear housing cover 13 is positioned on the rear end face of the housing main body 12 and by way of example is secured by a screw connection to the housing main body 12.

The housing front wall 9 is also expediently a component that is separate from the housing main body 12 and forms, for example, a front housing cover 14 mounted on a front end face of the housing main body 12.

Expediently, the front housing cover 14 belongs to an electrically actuated drive device 15, via which the valve 1 can be actuated as desired by means of electrical actuation signals.

Figure 1:
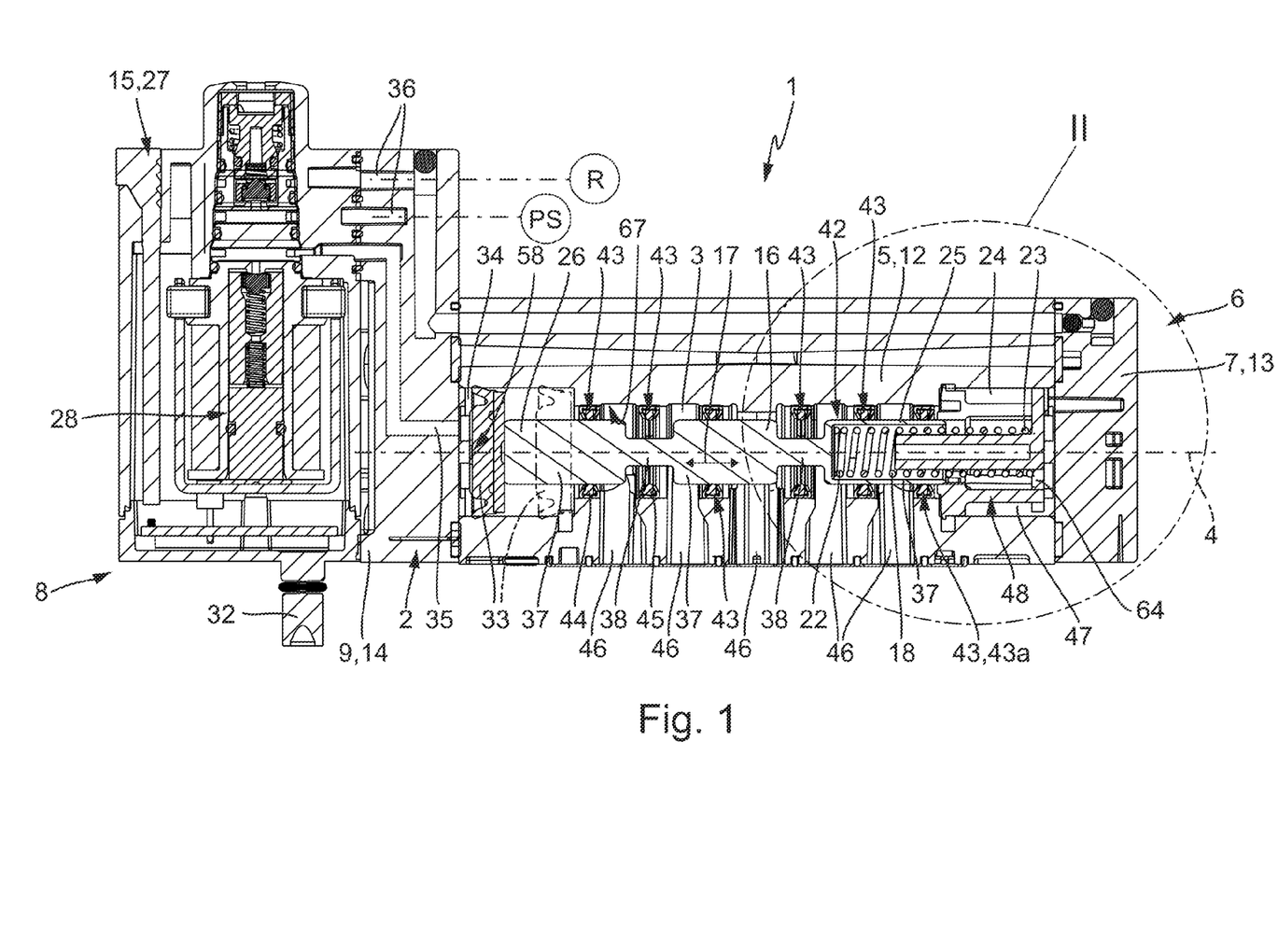
FIG. 1 a longitudinal section of a preferred embodiment of the valve according to the invention, wherein the valve slide is shown adopting a first switching position, which concerns a basic position brought about by the compression spring.
Figure 2:
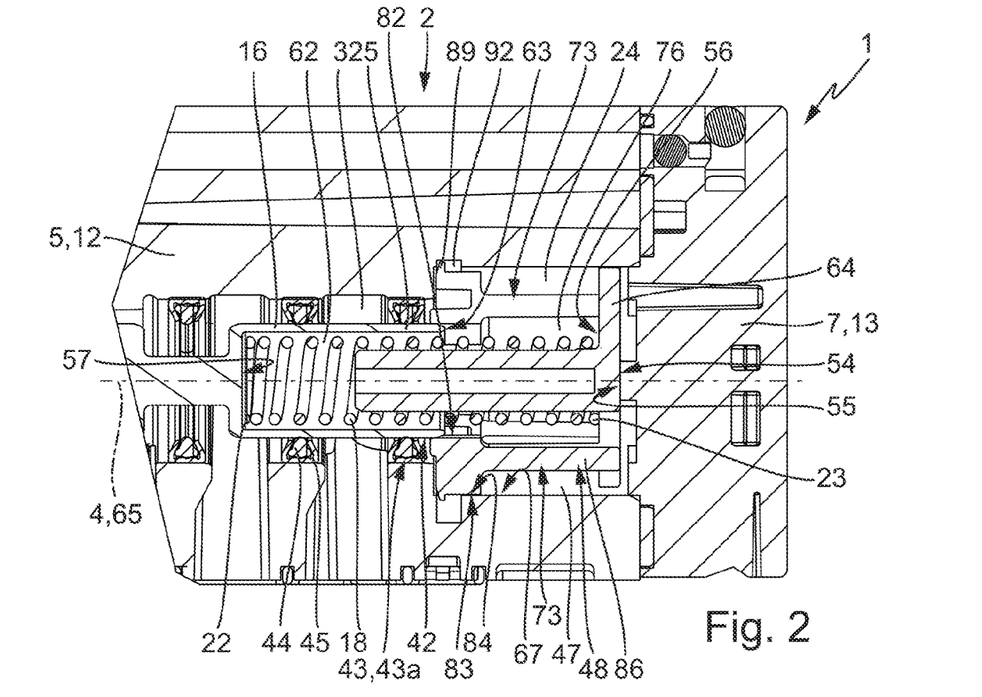
FIG. 2 an enlarged representation of the end position of the valve with a dot-dash border in FIG. 1, wherein the longitudinal section corresponds to sectional plane II-II from FIGS. 4 and 5.
Figure 3:
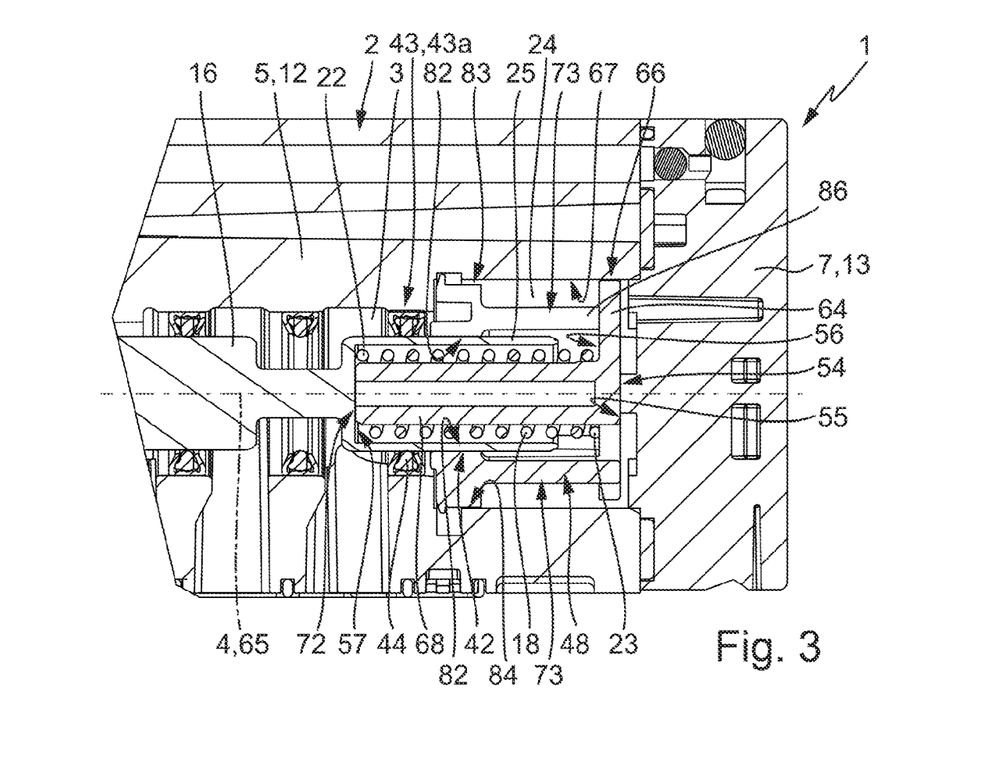
FIG. 3 the same section as FIG. 2, but in a second switching position of the valve slide, in which the compression spring is compressed.
Figure 4:
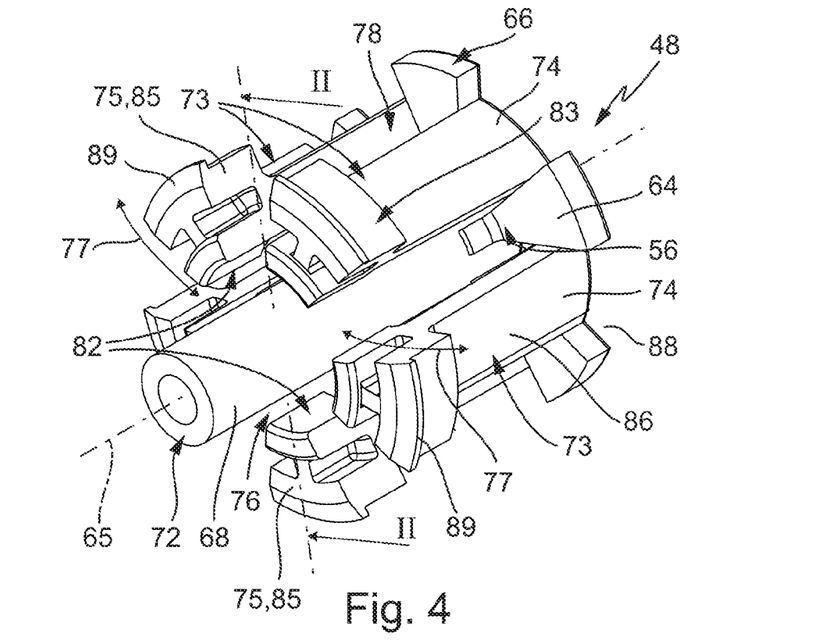
FIG. 4 a detailed representation of the supporting element used in the valve of FIGS. 1 to 3 in an isometric representation.
Figure 5:
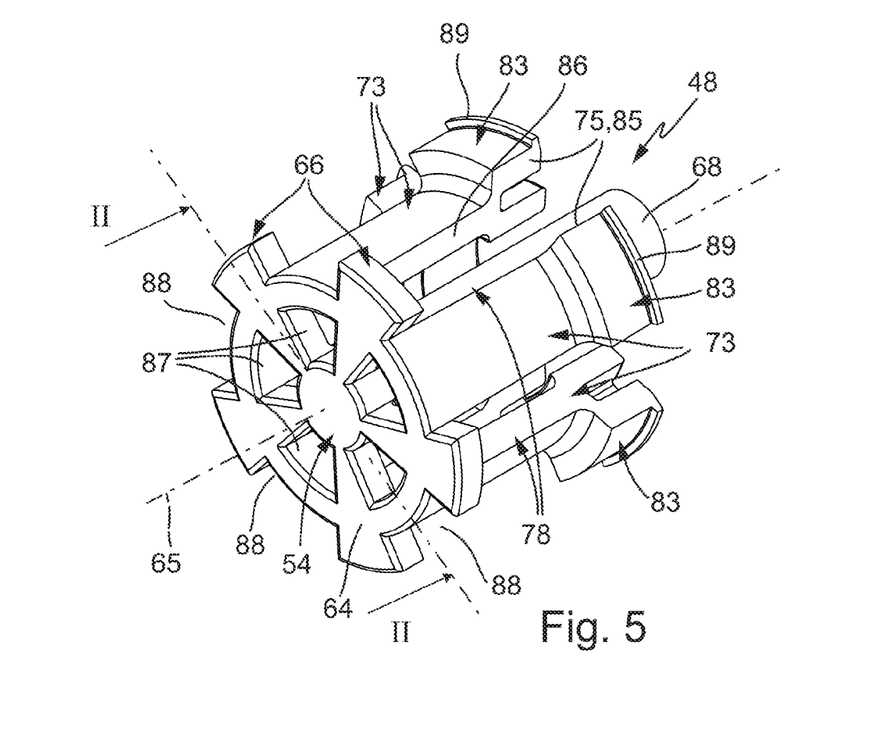
FIG. 5 the supporting element of FIG. 4 from another perspective.

A valve slide 16 with a longitudinal design extends coaxially in the housing interior 3. The valve slide 16 is shorter than the housing interior 3, so that by performing a linear switching movement 17 indicated by a double arrow it is switchable between a plurality of switching positions. FIGS. 1 and 2 show a first switching position, in which the valve slide 16 adopts an axial position approaching the housing front wall 9 within the housing interior 3. FIG. 1 indicates in a dot-dash fashion, and FIG. 3 illustrates, a possible second switching position of the valve slide 16, in which the valve slide 16 adopts an axial position approaching the rear housing cover 13 within the housing interior 3.

The first switching position of the valve slide 16 is a basic position present in the unactuated state of the valve 1. It is brought about by a mechanical compression spring 18, axially arranged in the housing interior 3 between the valve slide 16 and the housing rear wall 7. It is supported in each case independently of the axial position of the valve slide 16 by a front end portion 22 on the valve slide 16 and by a rear end portion 23 on the housing rear wall 7 or on the rear housing cover 13.

The longitudinal portion of the housing interior 3, in which the compression spring 18 is located, is referred to in the following as the rear interior end portion 24.

The valve slide 16 has a rear end portion 25 facing the rear side 6 and a front end portion 26 facing the front side 8. The compression spring 18 acts upon the rear end portion 25.

By means of the drive device 15, the valve slide 16 can be impinged upon in a controlled manner in the region of its end portion 26 with a driving force that counteracts the spring force of the compression spring 18. Through the corresponding actuation of the drive device 15 it is consequently possible to exert a driving force on the valve slide 16 that is large enough that this, by overcoming the spring force of the compression spring 18, moves to the second switching position shown in FIG. 2. The valve slide 16 remains there until the driving force is removed again. Following removal of the driving force, the valve slide 16 is pushed back by the spring force of the compression spring 18 into the first switching position according to FIGS. 1 and 2.

Preferably, the drive device 15 is designed as an electrically actuated pilot control valve device 27 which is the case for the exemplary embodiment illustrated. The pilot control valve device 27 contains, by way of example, an electromagnet 28 and can, on the basis of electrical actuation signals, which can be fed to an electrical connection device 32, impinge upon the front end portion 26 of the valve slide 16 with a control fluid bringing about the driving force. For example, the valve slide 16 has on its front end portion 26 a drive piston 33, that delimits a drive chamber 34, to which a drive channel 35 of the pilot control valve device 27 leads. The pilot control valve device 27 is connected via a number of pilot control channels 36 to a pilot pressure source PS and to a pressure sink R, in particular the atmosphere, so that the drive chamber 34 by corresponding actuation of the pilot control valve device 27, via drive channel 35, can either be impinged upon by the control pressure or have the pressure relieved.

According to an exemplary embodiment, not shown, the valve 1 is a directly actuated valve, to which the driving force is by way of example introduced directly by an electromagnetic drive device in the valve slide 16.

The valve slide 16 has an expediently externally circular cylindrical design. It can therefore be referred to as a piston valve. It has a plurality of longitudinal portions referred to as fastening portions 37, arranged one after the other at an axial distance, wherein directly adjacent fastening portions 37 are in each case connected together by a connecting portion 38, wherein the connecting portions 38 have a smaller external diameter than the fastening portions 37. Thus, the Radial outer circumference 42 of the valve slide 16 in the axial direction of the main axis 4 has a graduated contour with alternate circular cylindrical surface portions of different diameters.

In the housing interior 3 a plurality of annular sealing units 43 aligned coaxially to the main axis 4 are arranged one after the other, fixed relative to the housing. Each of the annular sealing units 43 has a rubber-elastic sealing ring 44 with a radially inwardly-directed annular sealing surface. The valve slide 16 extends through the sealing units 43 and thus also through the sealing rings 44. Those sealing units 43, which depending on the switching position of the valve slide 16, surround one of the fastening portions 37, bear with the sealing surface of their sealing ring 44, with a sealing effect, slidably against the radial outer circumference 42 of the valve slide 16.

For example, the sealing units 43 in each case have an annular support structure 45, via which they are secured to the housing perimeter wall 5 and on each of which one of the sealing rings 44 is supported.

The portions of the housing interior 3 between two axially adjacent sealing units 43 are in each case fluidically connected with one of a plurality of valve channels 46 passing through the valve housing. Depending on the switching position of the valve slide 16, the portions of the housing interior 3 positioned axially either side of a respective sealing unit 43 and thus also the vertical channels 46 connected thereto are either fluidically connected to one another or fluidically isolated from one another.

In a preferred embodiment the vertical channels 46 comprise a feed channel connectable to an external compressed air source, two working channels connectable with a consumer to be actuated and two relief channels connected with a pressure sink. In both switching positions of the valve slide 16 the two working channels are connected alternately with the feed channel or with a relief channel. The consumer connected involves, by way of example, a fluid-actuated drive.

The sealing unit 43 closest to the housing rear wall 7, which in the following for clarity is also referred to as rear sealing unit 43a, separates a portion of the housing interior 3 connected with a valve channel 46 from a longitudinal portion referred to as a spring accommodation chamber 47, delimited to the rear by the housing rear wall 7 and in which the compression spring 18 is located.

The rear end portion 25 of the valve slide 16 forms one of the fastening portions 37. The rear sealing units 43a bear slidably with their radially-inwardly directed annular sealing surface against the surface portion of the radial outer circumference 42 of the valve slide 16 formed on the rear end portion 25. The valve slide 16 protrudes with its rear end portion 25 coaxially into the spring accommodation chamber 47.

In the rear interior end portion 24 of the housing interior 3 a supporting element 48 is arranged, which is preferably designed as a separate component with respect to the valve housing 2 and thus also with respect to the rear housing cover 13. Assembly of the supporting element 48 takes place in such a way that it is axially inserted in the state in which the rear housing cover 13 is detached from the housing main body 12 according to arrow 52 in FIG. 6 through the then exposed rear opening 53 of the housing interior 3 into the rear interior end portion 24. The supporting element 48 thus defines a separate insert with respect to the valve housing 2.

The supporting element 48 expediently involves a one-piece body, which preferably consists of plastic. It is, by way of example, made from a polyamide.

The supporting element 48 has an axial end face 54 facing the rear housing cover 13. It bears against the interior wall surface 55 of the rear housing cover 13 that seals the housing interior 3.

The supporting element 48 has a support surface 56 opposite the rear axial end face 54, axially facing the front side 8, which for better differentiation is referred to as front axial support surface 56. The compression spring 18 bears with its rear end portion 23 against this front axial support surface 56.

The rear end portion 25 of the valve slide 16 has a rear axial support surface 57 facing the rear housing cover 13, on which the compression spring 18 is supported by its front end portion 22. Through the compression spring 18, the valve slide 16 is preloaded in the first switching position according to FIGS. 1 and 2, which is defined in that the valve slide 16 bears against a stop surface 58 des valve housing 2. For example, this stop surface 58 is formed on the housing front wall 9. Since the compression spring 18 also bears against the front axial support surface 56 of the supporting element 48, the supporting element 48 presses against the interior wall surface 55 of the rear housing cover 13.

The axial distance between the rear axial support surface 57 of the valve slide 16 adopting the first switching position and the front axial support surface 56 of the supporting element 48 supporting the rear housing cover 13 is selected such that the compression spring 18 has a certain compression and thus the valve slide 16 is held by a spring force from the compression spring 18 in the first switching position.

The rear axial support surface 57 is expediently formed by the floor surface of a recess 62 formed in the rear end portion 25 of the valve slide 16, which is axially open towards the rear housing rear wall 7. The valve slide 16 ends in the region of its rear end portion 25 with an annular rear end face 63, which surrounds the opening of the recess 62.

The compression spring 18 plunges with a longitudinal portion having the front end portion 22 into the recess 62.

The design of the compression spring 18 is essentially arbitrary. Preferably, it is designed as a helical spring, which is the case for the exemplary embodiment. The compression spring 18 is preferably one-piece, corresponding to the exemplary embodiment, but can also have a multi-part design.

The supporting element 48 has a supporting wall 64 extending in an extension plane at right angles to the main axis 4. Preferably, and corresponding to the exemplary embodiment, the supporting wall 64 has a disc-shaped design. The supporting wall 64 rear end portion forms the supporting element 48 facing the housing rear wall 7. The rear axial end face 54 is located at the rear on supporting wall 64.

The supporting element 48 has a central longitudinal axis 65. This longitudinal axis 65 coincides with the main axis 4. In order to guarantee this coaxial alignment, the supporting wall 64 has an external diameter, that corresponds substantially to the internal diameter of the rear interior end portion 24. As a result, the radial outer circumference of the supporting wall 64 forms a centering surface 66, which in the rear interior end portion 24 bears against the interior peripheral surface 67 of the housing perimeter wall 5 radially outwardly surrounding the housing interior 3. In this way, the supporting element 48 is coaxially centred with respect to the housing interior 3.

The front axial support surface 56 for the compression spring 18 is located on the front axial wall surface of the supporting wall 64 facing the valve slide 16.

So that the compression spring 18 always bears reliably with its rear end portion 23 against the front axial support surface 56, it is advantageous if the supporting element 48 has a centrally arranged centering pin 68, extending from the supporting wall 64 axially in the direction of the valve slide 16, onto which the compression spring 18 with its longitudinal portion having the rear end portion 23 is pushed. In the exemplary embodiment illustrated, the supporting element 48 is provided with a centering pin 68 that at the rear is integrally connected with the supporting wall 64. The centering pin 68 preferably has a circular cylindrical outer surface. Preferably, it has a tubular design and has a recess open towards its front end face 72 facing away from the supporting wall 64.

The supporting element 48, independently of the axial position of the valve slide 16, creates a transverse support for the rear end portion 25 of the valve slide 16 with respect to the valve housing 2 and in particular with respect to the housing perimeter wall 5.

In order to deploy this support effect, the supporting element 48 has a plurality of individual supporting arms 73, which in the rear interior end portion 24 starting from the supporting wall 64 respectively extend axially in the direction of the valve slide 16 and are arranged distributed around the main axis 4. The supporting arms 73 are radially spaced apart from the main axis 4. This arrangement results from the fact that the supporting arms 73 are in each case integrally connected with a rear end portion 74 at a radial distance from the longitudinal axis 65 with the supporting wall 64. The supporting arms 73 are distributed about the longitudinal axis 65. Preferably, the distribution is even. Each supporting arm 73 has a front end portion 75, which points away from the supporting wall 64 and with which the supporting arm 73 concerned freely ends.

Together, the supporting arms 73 surround a supporting element interior 76 open on the front side opposite the supporting wall 64, in which the compression spring 18 plunges with its rear longitudinal portion.

If the supporting element 48 according to the exemplary embodiment has a centering pin 68, the supporting arms 73 are distributed at a radial distance from the centering pin 68 about the centering pin 68. The supporting element interior 76 in this case has an annular structure and is located between the centering pin 68 and the arrangement of supporting arms 73.

Each supporting arm 73, independently of the other supporting arms 73, is springily deflectable in a radial direction with respect to the longitudinal axis 65 and thus also with respect to the main axis 4. The possible deflection movement 77 is shown by double arrows. The springiness is the result of the material used and of the fact that the supporting arms 73 are relatively thin in the radial direction with respect longitudinal axis 65.

The supporting element 48 of the exemplary embodiment has five supporting arms 73.

Between in each case immediately adjacent supporting arms 73 in the circumferential direction of the longitudinal axis 65 or the main axis 4 in each case an open longitudinal slot 78 is formed, which guarantees an optimal radial pivotability for the supporting arms 73. The longitudinal slots 78 are radially continuous. Axially at the front they are open, whereas axially at the rear they are sealed by the supporting wall 64.

The length of the supporting arms 73 measured in the axial direction of the main axis 4 is selected such that the supporting arms 73 axially overlap the rear end portion 25 of the valve slide 16 independently of the radial outward axial position adopted by this in the housing interior. In each possible axial position of the valve slide 16 the valve slide 16 plunges with its rear end portion 25 into the supporting element interior 76 such that it is flanked in the region of its radial outer circumference by the front end portions 75 of the supporting arms 73. The axial overlapping length is at its smallest in the first switching position of the valve slide 16 and at its greatest in the second switching position.

In the region overlapping the valve slide 16 each supporting arm 73 has on its radial inside facing the main axis 4 or the longitudinal axis 65 a guide surface 82. With this guide surface 82 each supporting arm 73 bears in the region of the rear end portion 25 slidably against the radial outer circumference 62 of the valve slide 16, and in fact in each axial position adopted by the valve slide 16 with respect to the valve housing 2. This means, in particular, that the valve slide 16 slides along the guide surfaces 82 during its switching movement 17. During the switching movement 17, it is only the axial overlapping length between the radial outer circumference 42 and the guide surface 82 bearing against the radial outer circumference 42 that changes.

Each supporting arm 73 has on its radial outside pointing away from the longitudinal axis 65 or the main axis 4 a radially outwardly pointing support surface 83, which is referred to in the following as radial support surface 83. The radial support surface 83 is, like the guide surface 82, arranged on the same supporting arm 73 with at an axial distance from the supporting wall 64.

Each supporting arm 73 bears with its radial support surface 83 against the housing perimeter wall 5 surrounding the supporting element 48. The interior peripheral surface 67 of the housing perimeter wall 5 forms in the region of the rear interior end portion 24 a radially inwardly pointing counter-support surface 84, against which the supporting arms 73 bear with their radial support surfaces 83.

Thus, transverse forces introduced into the rear end portion 25 of the valve slide 16 are absorbed by the housing perimeter wall 5 with the interposition of the supporting arms 73. In this way, an uneven loading of the sealing ring 44 and in particular of the sealing ring 44 of the rear sealing units 43 is avoided. Said transverse forces are in particular generated by the compression spring 18, when this is increasingly compressed upon switching into the second switching position.

Due to their springiness, the supporting arms 73 are able via their radial support surfaces 83 to individually align with the counter-support surface 84, so that the cross section surrounded by the guide surfaces 82 is precisely oriented coaxially to the housing interior 3 and accordingly the valve slide 16 is guided linearly displaceably at its rear end portion 25 with a precise coaxial position.

Preferably, the guide surface 82 and the radial support surface 83 are formed on each supporting arm 73 on a head portion 85 axially spaced apart from the supporting wall 84. This head portion 85 expediently defines the front end portion 75 of the supporting arm 73 concerned. Between the head portion 85 and the supporting wall 64 a web portion 86 of the supporting arm 73 extends, which preferably has a lamellar design and which is largely responsible for the flexibility of the supporting arm 73.

The head portion 85 in the radial direction with respect to the longitudinal axis 65 preferably has a greater thickness than the web portion 86, wherein it overhangs the web portion 86 both radially outwards and radially inwards. The radial support surface 83 is located radially outwards on the head portion 85, whereas the guide surface 82 is formed radially inwards on the head portion 85.

As can clearly be seen in particular in FIGS. 2 and 3, the supporting arms 73 are expediently, apart from their radial support surface 83, arranged over their entire length at a radial distance from the interior peripheral surface 67 of the housing perimeter wall 5.

The interior peripheral surface 67 of the housing perimeter wall 5 expediently has, at least in the region forming the counter-support surface 84, a circular cylindrical design. The radial support surfaces 83 expediently have the same arcuate curvature, so that in each case they bear over their entire surface against the counter-support surface 84. Preferably, the entire interior peripheral surface 67 is circular cylindrical.

The contour of the guide surfaces 82 expediently corresponds to that of the radial outer circumference 42 of the valve slide 16 in the region in contact with the guide surfaces 82. If according to the exemplary embodiment the radial outer circumference 82 on the rear end portion 25 of the valve slide 16 has a circular cylindrical design, the guide surfaces 82 in each case also have a corresponding arcuate curvature.

Preferably, the supporting arms 73 are in each case provided with a circular arc-shaped section over their entire length, so that the radial exterior surface has a convex curvature and the radial interior surface a concave curvature. The centres of curvature expediently lie on the longitudinal axis 65.

Preferably, the axial overlapping between the guide surfaces 82 and the valve slide 16 is smallest in the first switching position, wherein it is expediently very small. It is, by way of example, just ²/₁₀ mm to ⁵/₁₀ mm.

The axial length of the optional centering pin 68 is in particular selected so that it protrudes beyond the front end portions 75 of the supporting arms 73. As a result, the centering pin 68 can already plunge into the recess 62 in the first switching position of the valve slide 16 to guarantee an optimum transverse support of the compression spring 18.

Expediently, the centering pin 68 defines the second switching position of the valve slide 16. In the second switching position, the valve slide 16 bears with its rear axial support surface 57 against the front end face 72 of the centering pin 68.

The disc-shaped supporting wall 64 is expediently provided with a collar of axial wall through-holes 87 distributed about the longitudinal axis 65. The angular distribution of the wall holes 87 corresponds to that of the supporting arms 73. Each wall hole 87 in each case directly radially inwards joins with the rear end portion 74 of a supporting arm 73. The wall holes 87 provide a material saving and during injection moulding manufacture allow the passage of a suitable tool.

The disc-shaped supporting wall 64 is segmented in the region of its outer circumference expediently in the circumferential direction. It has a plurality of radially outwardly open wall recesses 88 distributed about the longitudinal axis 65. Each wall recess 88 radially outwardly joins the rear end portion 74 of a supporting arm 73. Due to this segmentation, the centering surface 66 does not have a continuous annular shape, but has multiple interruptions, such that it is made up of a plurality of successive centering surface portions spaced apart in the circumferential direction of the longitudinal axis 65.

Preferably, the supporting arms 73 are used during assembly of the valve for fixing the supporting element 48 in the preassembly position already discussed above and illustrated in FIG. 7.

To this end, each supporting arm 73 in a region axially spaced apart from the supporting wall 64 has a radially outwardly protruding retaining projection 89. The retaining projection 89 has by way of example a tooth-like design. Preferably, the retaining projections 89 are formed on the head portions 85.

Expediently, each retaining projection 89 connects axially at the front, thus on the side opposite the supporting wall 64, with the associated support surface 83.

The retaining projections 89 are provided for engaging in an annular groove-like retaining recess 92, which is formed in the rear interior end portion 24 of the housing interior 3 in the interior peripheral surface 67 of the housing perimeter wall 5. The retaining recess 92 is aligned coaxially to the main axis 4 and radially inwardly open. On the side nearest the rear housing cover 13 the retaining recess 92 is delimited by a rear recess flank 93.

The retaining recess 92 is positioned so that the retaining projections 89 at least in the assembled use position of the supporting element 48 can engage in them.

Figure 6:
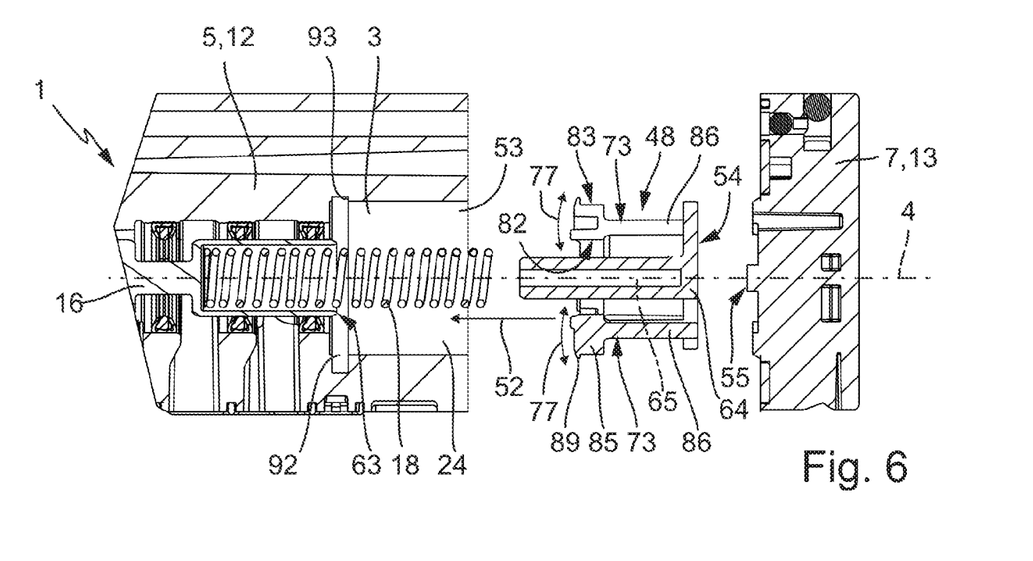
FIG. 6 the end portion of the valve seen in FIGS. 2 and 3 prior to assembly of the valve, wherein the supporting element and a housing cover have not yet been fitted.

In a preferred method of assembly of the valve 1, according to FIG. 6 the supporting element 48 is inserted in the still unassembled state of the rear housing cover 13 according to arrow 52, with the front end portions 75 of the supporting arms 73 first, in the rear interior end portion 24 of the housing interior 3. At this point the valve slide 16 has already been assembled and the compression spring 18 is inserted in the uncompressed state in the recess 62 of the valve slide 16.

The supporting arms 73 are formed such that the external diameter defined by the retaining projections 89 in the still unassembled state of the supporting element 48 is slightly greater than the internal diameter of the rear interior end portion 24 in the longitudinal portion extending between the rear opening 53 and the retaining recess 92. Upon insertion according to arrow 52 these supporting arms 73 are elastically deformed slightly and pushed radially inwards. They slide in the rear interior end portion 24 on the interior peripheral surface 67, until they reach the retaining recess 92 and snap into the same.

Upon insertion of the supporting element 48, the compression spring 18 is compressed. However, as soon as the supporting arms 73 have locked with their retaining projections 89 into the retaining recess 92, the compression spring 18 can no longer push the supporting element 48 out of the rear interior end portion 24. The retaining recesses 92 are supported on the rear recess flank 93, so that the supporting element 48 is axially supported with positive locking on the housing perimeter wall 5. Thus, the supporting element 48 adopts the preassembly position seen in FIG. 7.

Figure 7:
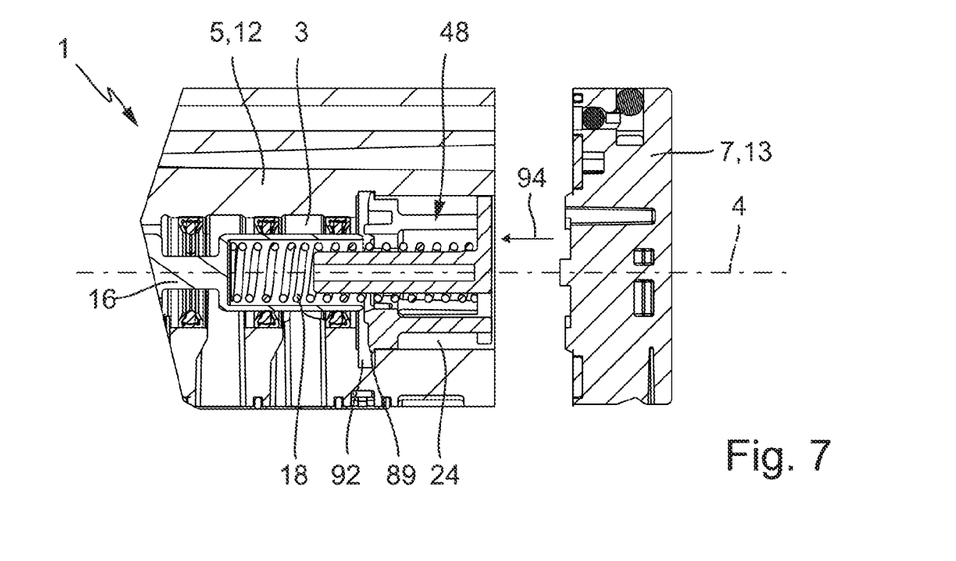
FIG. 7 a further situation during assembly of the valve wherein the supporting element is prefixed, adopting a preassembly position in the housing interior.

Now, in the next step, according to arrow 94 in FIG. 7, the rear housing cover 13 is placed with its end face on the housing main body 12, to seal the housing interior 3. During this placement procedure, the rear housing cover 13 comes to rest with its interior wall surface 55 against the rear axial end face 54 of the supporting element 48. Thus, the supporting element 48 in its use position is axially supported by the assembled rear housing cover 13.

Expediently, the preassembly position of the supporting element 48 does not yet correspond to the use position. The use position differs from the preassembly position in that the supporting element 48 is pushed somewhat further into the rear interior end portion 24. This positional difference is possible because the width of the groove-like retaining recess 92 measured in the axial direction of the main axis 4 is greater than the correspondingly measured width of the retaining projections 89. Furthermore, the rear interior end portion 24 is sufficiently deep for the supporting element 48 to adopt the desired use position. The axial movement of the of the supporting element 48 into the use position corresponding to a final assembly position is brought about by the rear housing cover 13, the interior wall surface 55 of which has a correspondingly prominent structure. Upon switching from the preassembly position into the final assembly position or use position, the retaining projections 89 lift from the rear recess flanks 93 and are pushed forwards into the retaining recess 92.

In the use position of the supporting element 48, the compression spring 18 has the desired preloading for operation of the valve 1.

The prefixing of the supporting element 48 to the housing main body 12 then allows a simple mounting of the rear housing cover 13 without any auxiliary device.

What is claimed is:

1. A valve comprising:
    a valve housing having a housing interior extending along a main axis formed therein, said valve housing further having a housing perimeter wall delimiting a radial outer circumference of the housing interior and a housing rear wall delimiting the housing interior at a rear side;
    a valve slide arranged in the housing interior, the valve slide being axially displaceable for positioning in various switching positions relative to the valve housing by changing an axial position of the valve slide adopted in relation to the valve housing; and
    a compression spring arranged in a rear interior end portion of the housing interior axially between the valve slide and the housing rear wall, the valve slide being preloaded by the compression spring in one of said various switching positions, the compression spring being supported on a rear end portion of the valve slide facing the housing rear wall and further being supported on a supporting wall of a supporting element extending in the rear interior end portion and the compression spring being supported axially in relation to the housing rear wall,
    wherein the supporting element comprises a plurality of individual supporting arms distributed around the main axis and extending in the rear interior end portion axially in a direction of the valve slide starting from the supporting wall,
    wherein the supporting arms are able to be deflected springily with respect to the main axis in the radial direction independently of one another,
    wherein the supporting arms axially overlap the rear end portion of the valve slide radially outwards independently of the axial position adopted by the valve slide relative to the valve housing, and
    wherein each supporting arm radially inwards has a guide surface slidably bearing against the radial outer circumference of the valve slide and wherein each supporting arm radially outwards has a radial support surface bearing against the housing perimeter wall.

2. The valve according to claim 1, wherein the interior peripheral surface of the housing perimeter wall radially outwardly enclosing the housing interior forms a counter-support surface, wherein the supporting arms bear on the counter-support surface with their respective radial support surface.

3. The valve according to claim 1, wherein an open longitudinal slot is formed between adjacent supporting arms in the circumferential direction of the main axis.

4. The valve according to claim 1, wherein the supporting arms each have a head portion at an axial distance from the supporting wall, wherein one of the guide surfaces and one of the radial support surfaces is formed on each head portion, and each head portion is connected with the supporting wall via a web portion.

5. The valve according to claim 1, wherein the supporting arms, apart from the radial support surface are each arranged over their entire length at a radial distance from the interior peripheral surface of the housing perimeter wall.

6. The valve according to claim 1, wherein the radial outer circumference of the valve slide has a circular cylindrical form at least at the rear end portion interacting with the guide surfaces of the supporting element of the valve slide.

7. The valve according to claim 1, wherein each of the supporting arms over their entire length have a circular arc-shaped section, wherein a concave longitudinal side lies radially inwards and faces the main axis.

8. The valve according to claim 1, wherein the supporting element has a centrally arranged centering pin extending from the supporting wall axially in the direction of the valve slide, the compression spring being located on the centering pin.

9. The valve according to claim 1, wherein the rear end portion of the valve slide has a recess open to the housing rear wall, wherein the compression spring plunges into the recess.

10. The valve according to claim 1, wherein the supporting element is a separate component with respect to the valve housing, the supporting element being inserted as a separate insert in the rear interior end portion of the housing interior and the supporting element bearing axially against an interior wall surface of the housing rear wall facing the housing interior.

11. The valve according to claim 10, wherein the housing rear wall is formed by a separate housing cover of the valve housing, the separate housing cover being secured to a housing main body of the valve housing defining the housing perimeter wall.

12. The valve according to claim 10, wherein the supporting element has a one-piece design and consists of plastic.

13. The valve according to claim 10, wherein the supporting wall of the supporting element has a disc-shaped design.

14. The valve according to claim 13, wherein the disc-shaped supporting wall has an axial wall through-opening in each of the areas radially inwardly adjoining the supporting arms.

15. The valve according to claim 10, wherein the supporting wall of the supporting element has a radial outer circumference, the radial outer circumference forming a centering surface, the centering surface bearing against the interior peripheral surface of the housing perimeter wall within the rear interior end portion for the coaxial centering of the supporting element with respect to the main axis.

16. The valve according to claim 15, wherein the supporting wall of the supporting element has a radially outwardly open wall recess interrupting the centering surface.

17. The valve according to claim 1, wherein, in the interior peripheral surface of the housing perimeter wall in the region of the rear interior end portion, a radially inwardly-open annular retaining recess is formed, wherein each of the supporting arms of the supporting element engage with a radially outwardly protruding retaining projection in the retaining recess.

18. The valve according to claim 17, wherein the width measured in the axial direction of the main axis of the annular retaining recess is greater than the correspondingly measured width of the respectively associated retaining projection, such that the supporting element in the state in which the retaining projections engage in the retaining recesses has limited axial movability relative to the housing perimeter wall.

19. The valve according to claim 1, wherein, in the housing interior coaxially to the main axis, a plurality of annular sealing units is arranged axially in succession and fixed relative to the valve housing, each of the annular sealing units comprising a rubber-elastic sealing ring designed for a sealing interaction with the radial outer circumference of the valve slide, wherein portions of the housing interior positioned between axially adjacent sealing units each communicate with one of a plurality of valve channels passing through the valve housing, wherein the valve channels depending on the switching position of the valve slide are fluidically interconnectable with various patterns.

20. The valve according to claim 1, wherein the valve is designed as a monostable multiport valve, the valve slide of the monostable multiport valve being switchable between two switching positions, a first switching position of the two switching positions being a neutral position determined by the compression spring, wherein the valve contains a drive device, wherein the valve slide can be impinged upon by a driving force of the drive device for switching to a second switching position.

* * * * *